US008878768B2

(12) United States Patent
Nagata et al.

(10) Patent No.: US 8,878,768 B2
(45) Date of Patent: Nov. 4, 2014

(54) DISPLAY DEVICE

(71) Applicant: Japan Display East Inc., Mobara (JP)

(72) Inventors: Koji Nagata, Hachioji (JP); Koji Doi, Chiba (JP)

(73) Assignee: Japan Display Inc., Tokyo (JP)

( * ) Notice: Subject to any disclaimer, the term of this patent is extended or adjusted under 35 U.S.C. 154(b) by 36 days.

(21) Appl. No.: 13/851,144

(22) Filed: Mar. 27, 2013

(65) Prior Publication Data

US 2013/0278516 A1    Oct. 24, 2013

(30) Foreign Application Priority Data

Apr. 19, 2012    (JP) ................................. 2012-095405

(51) Int. Cl.
*G09G 3/36*    (2006.01)
*G06F 3/041*    (2006.01)
*G06F 3/044*    (2006.01)

(52) U.S. Cl.
CPC .............. *G06F 3/041* (2013.01); *G06F 3/0412* (2013.01); *G06F 3/044* (2013.01)
USPC .......................................... 345/104; 345/174

(58) Field of Classification Search
USPC .................. 345/87, 104, 173–179; 178/18.01–18.07, 19.01–19.05
See application file for complete search history.

(56) References Cited

U.S. PATENT DOCUMENTS

| | | | | |
|---|---|---|---|---|
| 7,855,779 B2 * | 12/2010 | Nozawa | | 356/73 |
| 2010/0265212 A1 | 10/2010 | Sekiguchi et al. | | |
| 2010/0328274 A1 * | 12/2010 | Noguchi et al. | | 345/204 |
| 2011/0234508 A1 * | 9/2011 | Oda et al. | | 345/173 |
| 2012/0050180 A1 * | 3/2012 | King et al. | | 345/173 |
| 2013/0057507 A1 * | 3/2013 | Shin et al. | | 345/174 |
| 2013/0278560 A1 * | 10/2013 | Yamaguchi | | 345/174 |

FOREIGN PATENT DOCUMENTS

JP    2010-256956    11/2010

* cited by examiner

*Primary Examiner* — Ricardo L Osorio
(74) *Attorney, Agent, or Firm* — Antonelli, Terry, Stout & Kraus, LLP.

(57) ABSTRACT

Provided is a display device that includes a display panel; and a touch panel integrated in the display panel, wherein the touch panel has a plurality of scanning electrodes, a plurality of detection electrodes that intersects with the plurality of scanning electrodes, drive signal supply unit for inputting a drive signal to each of the scanning electrodes, detection unit for acquiring a detection signal from each of the detection electrodes, touch position detection unit for detecting a touch position of an detection object based on the detection signal when the drive signal is sequentially input to each of the scanning electrodes from the drive signal supply unit, and approach detection unit for detecting that the detection object approaches the touch panel based on the detection signal when a scanning voltage is collectively input to all of the scanning electrodes from the drive signal supply unit.

8 Claims, 12 Drawing Sheets

DISPLAY DEVICE

CROSS-REFERENCE TO RELATED APPLICATION

The present application claims priority from Japanese application JP2012-095405 filed on Apr. 19, 2012, the content of which is hereby incorporated by reference into this application.

BACKGROUND OF THE INVENTION

1. Field of the Invention

The present invention relates to a display device, particularly, to a technique that is effective for the application to a display device equipped with a touch panel in which a liquid crystal panel is equipped with a touch panel function.

2. Description of the Related Art

A display device including a device referred to as a touch sensor or a touch panel, which performs a touch operation (a contact pressing operation, hereinafter, simply referred to as a touch) on a display screen using a finger of a user, a pen or the like to input information, has been used for a mobile electronic apparatus such as a PDA and a portable terminal, various home electric appliances, an automated teller machine or the like. As such a touch panel, a resistive membrane type of detecting a resistance valve change of a touched portion, an electrostatic capacity type of detecting a change of the capacity, an optical sensor type of detecting a change of an amount of light or the like have been known.

The touch panel of the electrostatic capacity type is provided with scanning electrodes (Y electrodes) for a drive signal application placed lengthwise and breadthwise in a two dimensional matrix form, and detection electrodes (an X electrodes) for signal detection perpendicular to the scanning electrodes, and the capacity of each electrode is detected in an input processing unit. When a conductor such as a finger comes into contact with the surface of the touch panel, since the capacity of each electrode increases, the input processing unit detects the increase, and calculates the input coordinate on the basis of the signal of the change of the capacity detected by each electrode.

SUMMARY OF THE INVENTION

For example, in the touch panel-integrated display device in which the touch panel is built in the liquid crystal display panel, a common electrode for display (also referred to as a counter electrode) originally included in the liquid crystal display panel is also used as one electrodes (drive electrodes) of a pair of electrodes for touch sensor, and the other electrodes (detection electrodes for sensor) thereof is formed on a glass substrate.

In such a touch panel-integrated display device, a new usage method is assumed in which, if it is possible to detect the approach of a finger (an detection object) of a user, when the finger of the user approaches, a menu screen is displayed on the display screen of the touch panel-integrated display device.

When assuming such a usage method, in the touch panel-integrated display device, it is requested that a detection circuit, which is used for a type of performing the high-precision coordinate detection (hereinafter, also referred to as a mutual detection) which uses the change of the electrostatic capacity between the common electrode and the detection electrode due to the influence of a finger of a user, can also be used for a type of detecting the presence or absence of the approach of the detection object without coordinate information (hereinafter, also referred to as a self detection) which uses a change of an earth capacity of the detection electrode due to the influence of a finger of a user.

The invention was based on the above-mentioned demand, and an object thereof is to provide a technique that makes the detection circuit, which is used for the mutual detection, also be used for the self detection, in the touch panel-integrated display device.

The above-mentioned and other objects and new characteristics of the invention will be clarified by the description of the specification and the attached drawings.

A representative summary of the inventions disclosed in the present application will be briefly described as below.

(1) According to an aspect of the invention, there is provided a display device that includes a display panel, and a touch panel integrated in the display panel, wherein the touch panel has a plurality of scanning electrodes formed on the display panel; a plurality of detection electrodes that is formed on the display panel and intersects with the plurality of scanning electrodes; drive signal supply unit for inputting a drive signal to each of the scanning electrodes; detection unit for acquiring a detection signal from each of the detection electrodes; touch position detection unit for detecting a touch position of an detection object, based on the detection signal detected from each of the detection unit, when the drive signal is sequentially input to each of the scanning electrodes from the drive signal supply unit; and approach detection unit for detecting that the detection object approaches the touch panel, based on the detection signal detected from each of the detection unit, when a scanning voltage is collectively input to all the scanning electrodes from the drive signal supply unit.

(2) In the display device according to (1), the drive signal supply unit has a switching element S1 that supplies a drive voltage Vtxh to each of the plurality of scanning electrodes, and a switching element S2 that supplies a drive voltage Vtxl (Vtxl<Vtxh) to each of the plurality of scanning electrodes, the detection unit has an integration circuit in which a reference voltage Vref is input to one terminal, a switching element S3 that is connected between each of the detection electrodes and the other terminal of the integration circuit, and a switching element S4 that is connected between each of the detection electrodes and the one terminal of the integration circuit, the switching element S1 and the switching element S2 are provided for each of the scanning electrodes, and the integration circuit, the switching element S3 and the switching element S4 are provided for each of the detection electrodes.

(3) In the display device according to (2), a touch position detection period of the detection object has a reset period and a detection period for each of the scanning electrodes, in the reset period in a scanning electrode of a scanning target to which the drive signal is input, the switching element S1 of the scanning electrode of the scanning target is turned off, the switching element S2 of the scanning electrode of the scanning target is turned on, the switching element S1 and the switching element S2 of the scanning electrode other than the scanning target are turned off, the switching elements S3 of all the detection electrodes are turned off, and the switching elements S4 of all the detection electrodes are turned on, the capacity between the scanning electrode of the scanning target and all the detection electrodes is charged with a voltage of (Vref−Vtxl), in the detection period, the switching element S1 of the scanning electrode of the scanning target is turned on, the switching element S2 of the scanning electrode of the scanning target is turned off, the switching element S1 and the switching element S2 of the scanning electrode other than the scanning target are turned off, all the switching elements S3 are turned on, all the switching elements S4 are turned off, and the electric current flowing in the capacity between the scanning electrode of the scanning target and all the detection electrodes is integrated by the integration circuit provided for each of the detection electrodes, and the touch position detection unit detects the touch position of the detection object, based on the output voltage of the integration circuit provided for each of the detection electrodes.

(4) In the display device according to (2), the approach detection period of the detection object has a reset period, a charge period, and a detection period, during the reset period, the switching elements S1 of all the scanning electrodes are turned off, the switching elements S2 of all the scanning electrode are turned on, the switching elements S3 of all the detection electrodes are turned off, and the switching elements S4 of all the detection electrodes are turned on, the capacity between all the scanning electrodes and all the detection electrodes is charged with a voltage of (Vref−Vtxl), during the charge period, the switching elements S1 of all the scanning electrodes are turned on, the switching elements S2 of all the scanning electrodes are turned off, the switching elements S3 of all the detection electrodes are turned off, and the switching elements S4 of all the detection electrodes are turned off, the capacity between all the scanning electrodes and each of the detection electrodes is charged with a voltage of (Vref−Vtxl+Vtxh), during the detection period, the switching elements S1 of all the scanning electrodes are turned on, the switching elements S2 of all the scanning electrodes are turned off, the switching elements S3 of all the detection electrodes are turned on, and the switching elements S4 of all the detection electrodes are turned off, the capacity between all the scanning electrodes and each of the detection electrodes is integrated by the integration circuit provided for each of the detection electrodes, and the approach detection unit detects that the detection object approach, based on the output voltage of the integration circuit provided for each of the detection electrodes.

Effects obtained by the representative aspect of the inventions disclosed in the present application are described as follows.

According to the invention, in the touch panel-integrated display device, the detection circuit used for the mutual detection can also be used for the self detection.

DETAILED DESCRIPTION OF THE INVENTION

Figure 1A:
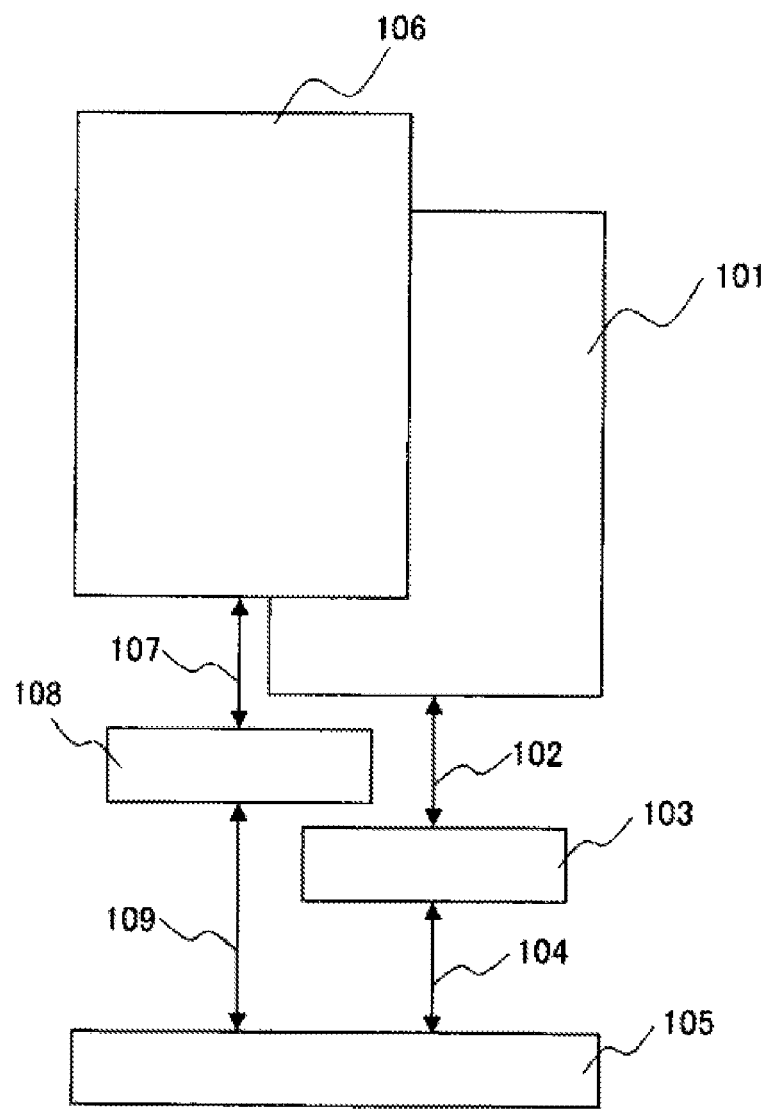
FIGS. 1A and 1B are views that describe a touch panel display device of the related art.

Hereinafter, an example of the invention will be described in detail referring to the drawings.

In addition, in the whole drawings for describing the example, elements having the same functions are denoted by the same reference numerals, and the repeated description will be omitted. Furthermore, the following example does not limit the interpretation of the claims of the invention.

Summary of Touch Panel of Related Art

Figure 1B:
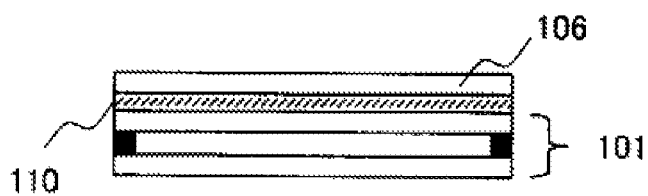

FIGS. 1A and 1B are views for describing a touch panel display device of the related art.

FIG. 1A is a block diagram that shows a schematic configuration of the touch panel display device of the related art, and FIG. 1B is a view that shows a structure of the touch panel display device of the related art.

In the touch panel display device shown in FIGS. 1A and 1B, as shown in FIG. 1B, an electrostatic capacity type touch panel 106 is bonded on a display panel (herein, a liquid crystal display panel) 101 by an adhesive 110. As will be described later, the touch panel 106 has a Y electrode for drive signal application (a scanning electrode) and an X electrode for signal detection (a detection electrode) perpendicular to the Y electrode.

The touch panel 106 is provided on a front surface of the display panel 101. Thus, when a user sees images displayed on the display panel 101, since the display images need to penetrate the touch panel 106, it is preferable that the touch panel 106 have high optical transmittance.

The X electrode and the Y electrode of the touch panel 106 are connected to a touch panel control unit 108 through a wiring 107.

The touch panel control unit 108 sequentially applies the drive signal using the Y electrode as a scanning electrode, and measures the capacity between the electrodes on an intersection point of each electrode using the X electrode as a detection electrode, and calculates and obtains the input coordinates from the capacity detection signal that changes according to the capacity value of the point of intersection between the respective electrodes.

The touch panel control unit 108 transmits the input coordinate to a system control unit 105 using an I/F signal 109.

When the input coordinate is transmitted from the touch panel 106 by the touch operation, the system control unit 105 generates the display image depending on the touch operation, and transmits the display image to a display control circuit 103 as a display control signal 104.

The display control circuit 103 generates a display signal 102 depending on the display image transmitted by the display control signal 104, and displays the images on the display panel 101.

In addition, as the display panel, a panel capable of using the touch panel 106 may be used, and a display panel that uses an organic light emitting diode element and a surface conduction type electron emission element, an organic EL display panel or the like can also be used, without being limited to a liquid crystal display panel.

Figure 2A:
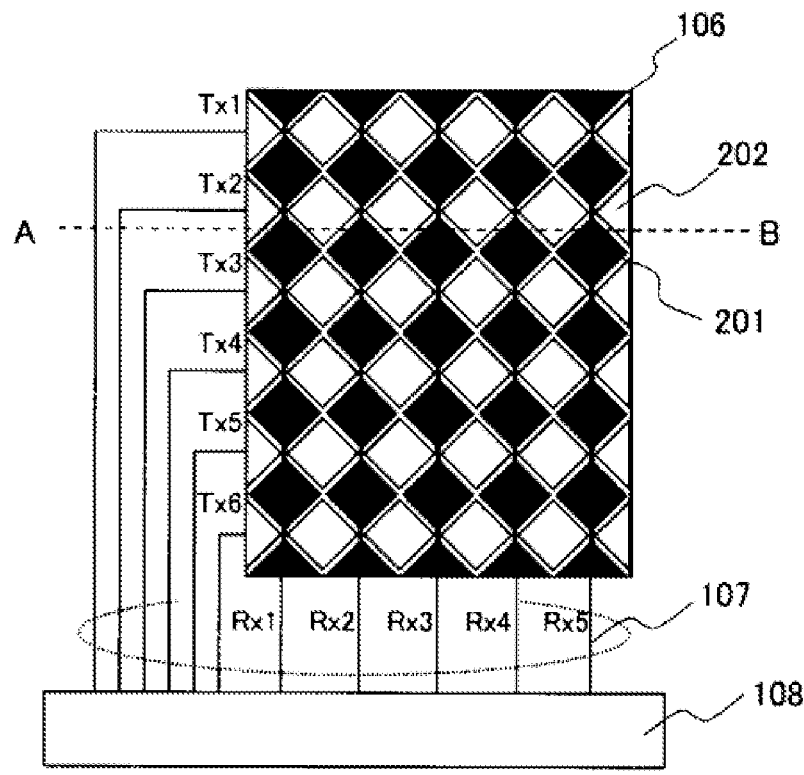
FIGS. 2A and 2B are views that describe the touch panel shown in FIGS. 1A and 1B.
Figure 2B:
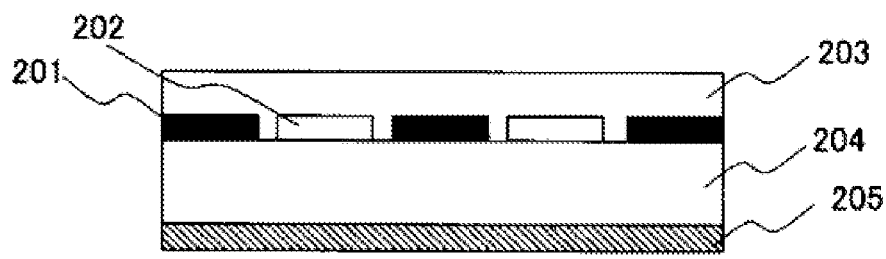

FIGS. 2A and 2B are views for describing the touch panel 106 shown in FIGS. 1A and 1B.

FIG. 2A is a view that shows an electrode pattern of the touch panel 106 shown in FIGS. 1A and 1B, and FIG. 2B is a cross-sectional view that shows a cross-sectional structure along a cut line A-B of FIG. 2A.

As shown in FIG. 2A, the touch panel 106 shown in FIGS. 1A and 1B has an X electrode 201 and a Y electrode 202 for detecting the capacity. Herein, for example, although five X electrodes 201 and six Y electrodes 202 are shown, the number of the electrodes is not limited thereto.

In FIG. 2B, reference numeral 204 is a touch panel substrate formed of a glass substrate, a PET film or the like. The touch panel 106 shown in FIGS. 1A and 1B is configured so that the X electrode 201 and the Y electrode 202 are formed on the touch panel substrate 204, and a protective membrane 203 is formed on the X electrode 201 and the Y electrode 202. Furthermore, in FIG. 2B, a shield electrode 205 is formed on a surface of the display panel side of the touch panel substrate 204.

Figure 2C:
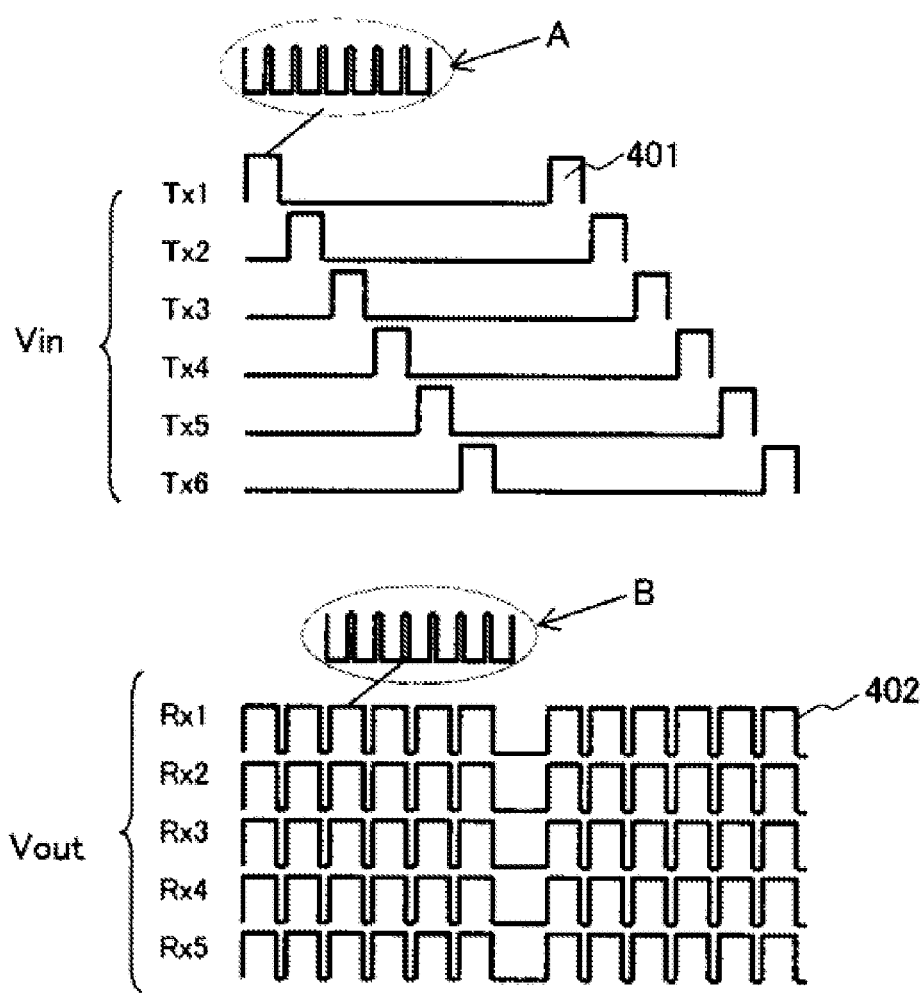
FIG. 2C is a view that describes a detection sequence of the touch panel shown in FIGS. 1A and 1B.

FIG. 2C is a view for describing the detection sequence of the touch panel 106 shown in FIGS. 1A and 1B, and for describing the detection sequence when there is no input to the touch panel 106. Furthermore, FIG. 2C is a wave form view. In the wave form view shown in FIG. 2C, a horizontal axis indicates a time and a vertical axis indicates amplitude.

As shown in FIG. 2C, a drive voltage (a drive pulse) 401 is sequentially applied to the Y electrode 202 of TX1 to TX6 for each scanning period. On the contrary, the wave form of a detection signal 402 detected by the X electrode 201 of RX1 to RX5 changes in synchronization with the input of the drive voltage. In FIG. 2C, since there is no input to the touch panel 106, the amplitude of the detection signal detected by the X electrode 201 of RX1 to RX5 is not greatly changed.

In addition, as shown in A of FIG. 2C, the drive signal (the input pulse) 401 which is sequentially input to the Y electrode 202 of TX1 to TX6 for each detection period is a plurality of pulse rows. Similarly, as shown in B of FIG. 2C, the detection signal 402 detected by the X electrode 201 of RX1 to RX5 is also a plurality of pulse rows.

Figure 3A:
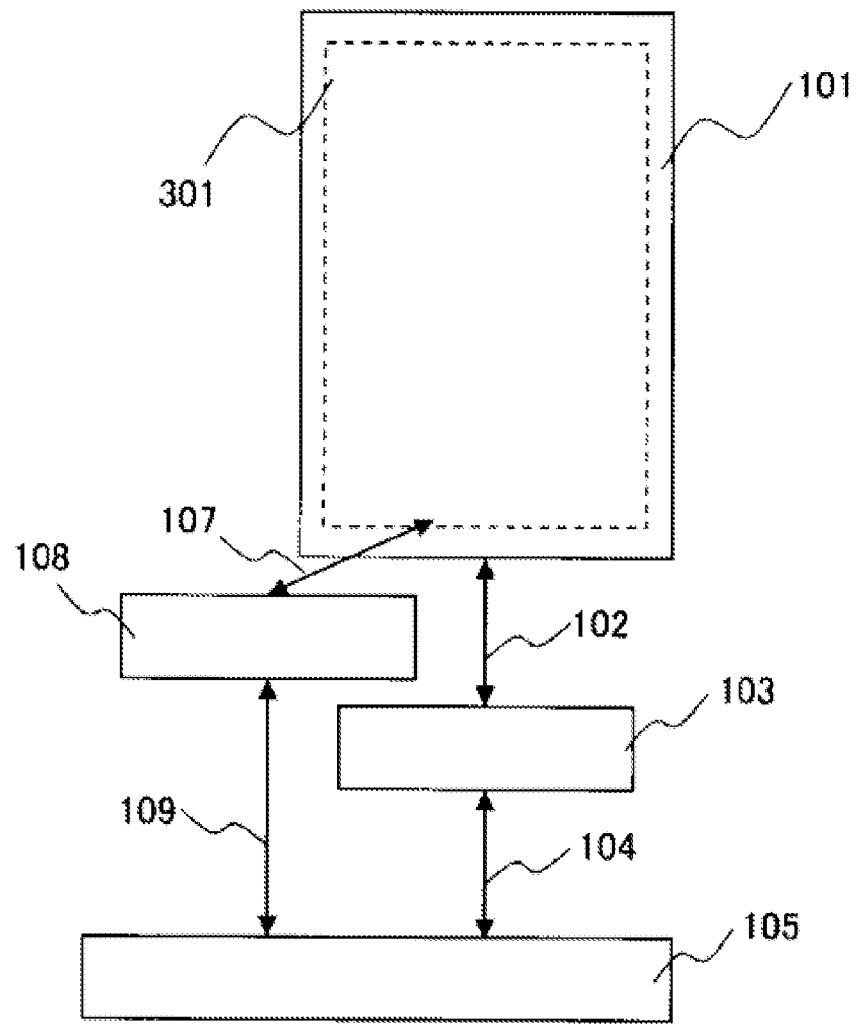
FIGS. 3A and 3B are views that describe a display device equipped with a touch panel of the related art.
Figure 3B:

FIGS. 3A and 3B are views for describing the touch panel-integrated display device of the related art.

FIG. 3A is a block diagram that shows a schematic configuration of the touch panel-integrated display device of the related art, and FIG. 3B is a view that shows a cross-sectional structure of the touch panel-integrated display device of the related art.

In the touch panel-integrated display device shown in FIGS. 3A and 3B, as shown in FIG. 3B, an electrostatic capacity type touch panel 301 is formed inside the display panel (herein, the liquid crystal display panel) 101. Other configurations are the same as those of FIG. 1A, and the repeated detailed description thereof will be omitted.

Figure 4A:
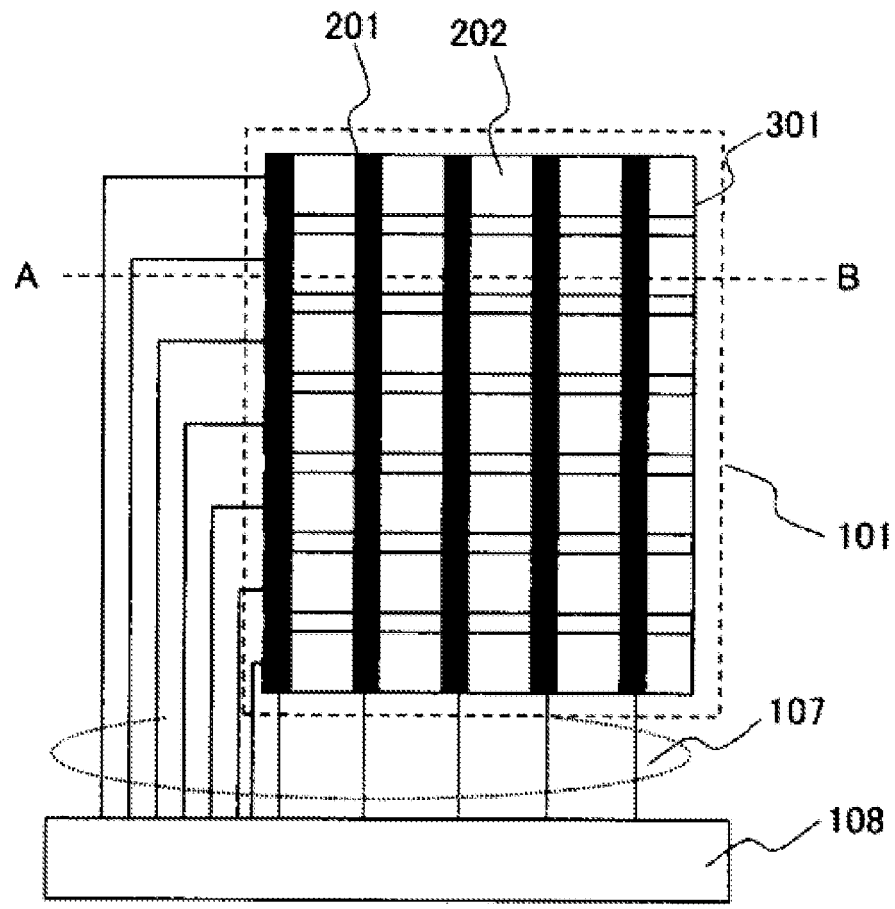
FIGS. 4A and 4B are views for describing the touch panel shown in FIGS. 3A and 3B.
Figure 4B:
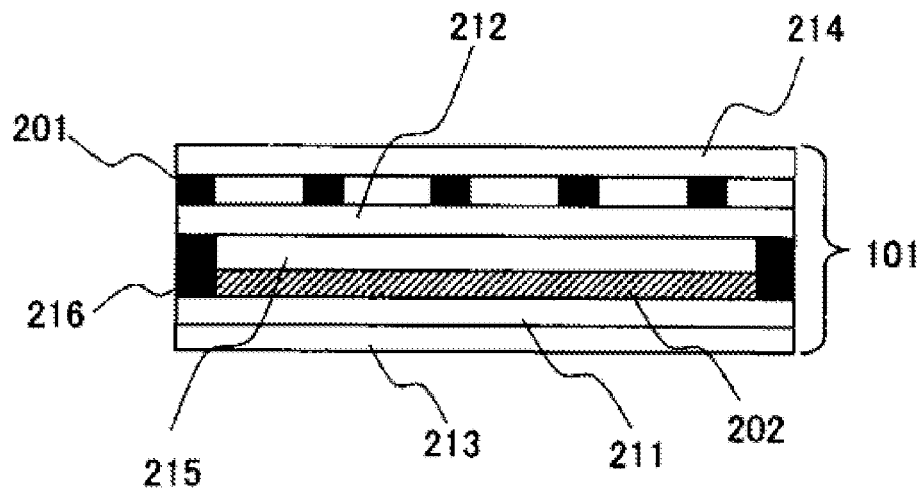

FIGS. 4A and 4B are views for describing the touch panel 301 shown in FIGS. 3A and 3B, FIG. 4A is a view that shows an electrode pattern of the touch panel 301 shown in FIGS. 3A and 3B, and FIG. 4B is a cross-sectional view that shows a cross-sectional structure along a cut line A-B of FIG. 4A.

As shown in FIG. 4A, the touch panel 301 shown in FIGS. 3A and 3B has the X electrode 201 and the Y electrode 202 for detecting the capacity. Herein, for example, although the five X electrodes 201 and the seven Y electrodes 202 are shown, the number of the electrodes is not limited thereto.

In FIG. 4B, reference numeral 211 is a first substrate, reference numeral 212 is a second substrate, reference numeral 213 is a lower polarizing plate, reference numeral 214 is an upper polarizing plate, reference numeral 215 is a liquid crystal layer, and reference numeral 216 is a seal material. As shown in FIG. 4B, the X electrode 201 and the Y electrode 202 are formed on the different parts of the structural member of the liquid crystal display panel. In addition, it is preferable that the first substrate 211 and the second substrate 212 have high optical transmittance.

Furthermore, generally, in an IPS type liquid crystal display panel, on the surface of the liquid crystal layer side of the first substrate 211, from the first substrate 211 toward the liquid crystal layer 215, a scanning line (also referred to as agate line), an interlayer insulating film, a picture line (also referred to as a source line or a drain line), a thin film transistor (TFT), a pixel electrode, an interlayer insulating film, a counter electrode (also referred to as a common electrode), and an oriented film are sequentially formed. However, FIG. 4B does not show these components.

Furthermore, on the liquid crystal layer side of the second substrate 212, from the second substrate 212 toward the liquid crystal layer 215, an optical shielding film, color filters of red, green and blue, a flattening film, and an oriented film are sequentially formed. However, FIG. 4B does not show these components.

In the structure of FIG. 4B, a back electrode formed on a surface opposite to the liquid crystal layer of the second substrate also serves as the X electrode 201, and the counter electrode Y also serves as the Y electrode 202.

Figure 5A:
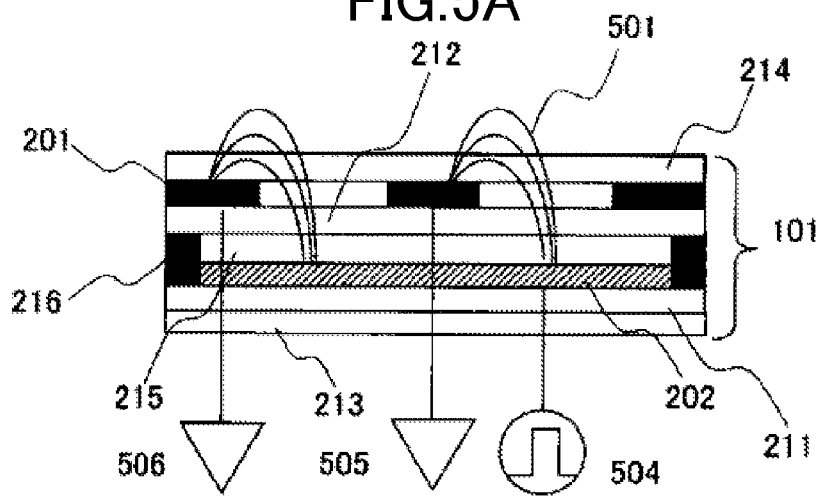
FIGS. 5A, 5B and 5C are views that describe a detection principle of a liquid crystal touch panel-integrated display device having the structure shown in FIGS. 4A and 4B.
Figure 5B:
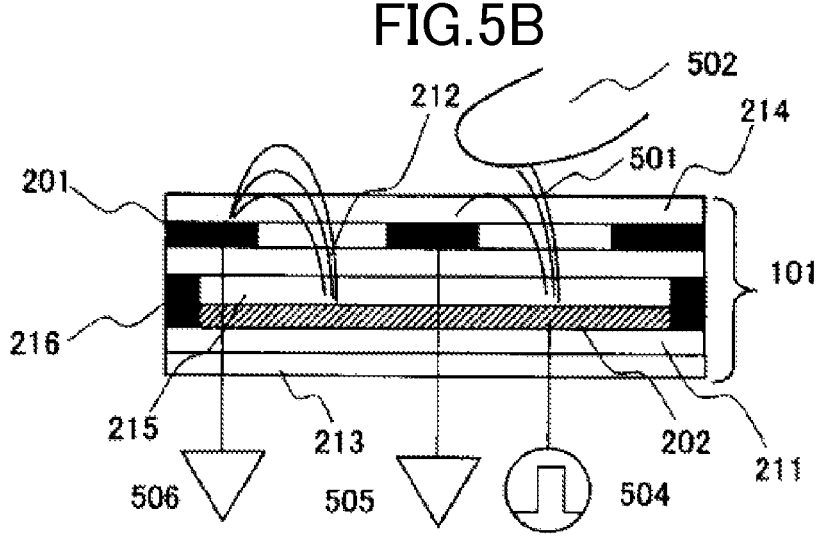
Figure 5C:
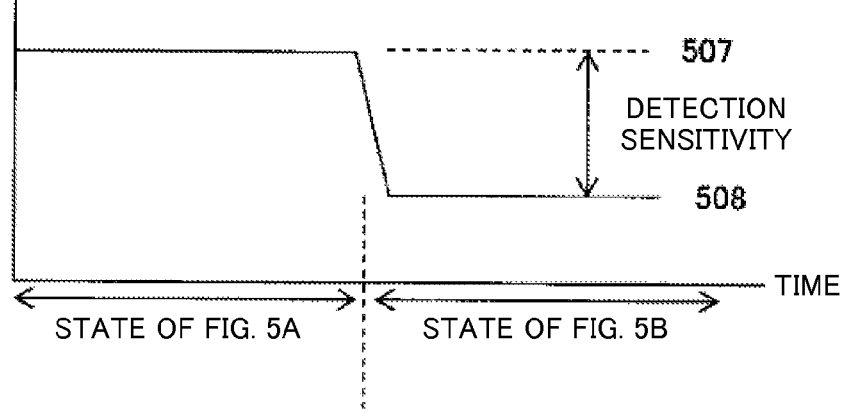

FIGS. 5A, 5B and 5C are views that show a detection principle of the touch panel-integrated display device having the structure shown in FIGS. 4A and 4B.

FIG. 5A is a view that shows a state where the touch operation is not performed, FIG. 5B is a view that shows a state where a finger 502 approaches the touch panel 106, and FIG. 5C is a graph that shows a change of the detected signal.

As shown in FIGS. 5A, 5B and 5C, a voltage source 504 is connected to any one electrode (herein, the Y electrode 202) of the X electrode 201 and the Y electrode 202, the pulse (the drive signal) is input from the voltage source 504, and the transient current accompanied with the input pulse from the voltage source 504 is detected in the detection circuits (505 and 506) via the other electrode (herein, the X electrode 201) that performs the capacity coupling. As shown in FIG. 5A, the capacity coupling forms a line 501 of electric force between the X electrode and the Y electrode.

As shown in FIG. 5B, when the finger 502 approaches the touch panel 106, the line 501 of electric force is cut off. Thereby, the transient current is reduced.

As shown in FIG. 5C, when the finger 502 or the like comes into closely contact with, the detection signal level detected in the detection circuits (505 and 506) is changed from a detection signal level 507 before the contact shown in FIG. 5A to a detection signal level 508 after the contact shown in FIG. 5B. A difference between the detection signal level 507 and the detection signal level 508 is detection sensitivity.

In addition, as shown in B of FIG. 2C, since the detection signal detected by each X electrode 201 is a plurality of pulse rows, the detection circuits (505 and 506) accumulate the detection signals of the plurality of pulse rows. Specifically, the detection circuits integrate the detection signals by the integration circuit to detect the signals of the detection signal level 507 and the detection signal level 508.

Hereinafter, in the touch panel-integrated display device, a type (a mutual detection) of performing the high-precision coordinate detection, by the use of the change of the electrostatic capacity between the counter electrode (the Y electrode 202 of FIGS. 4A and 4B) and the detection electrode for sensor (the X electrode 201 of FIGS. 4A and 4B) by the influence of a finger of a user will be described.

Figure 6A:
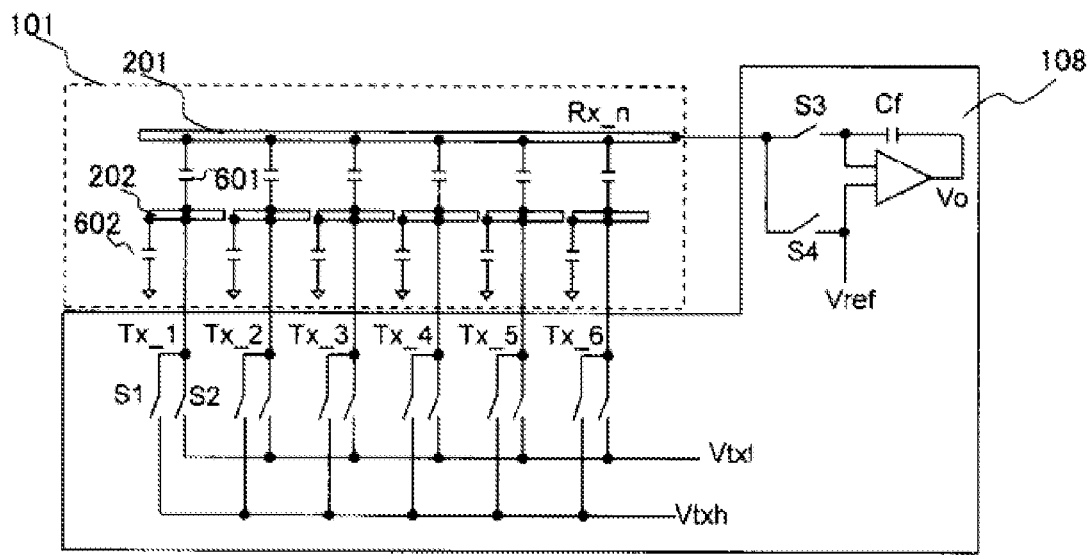
FIGS. 6A and 6B are views that describe a mutual detection in the touch panel-integrated display device.
Figure 6B:
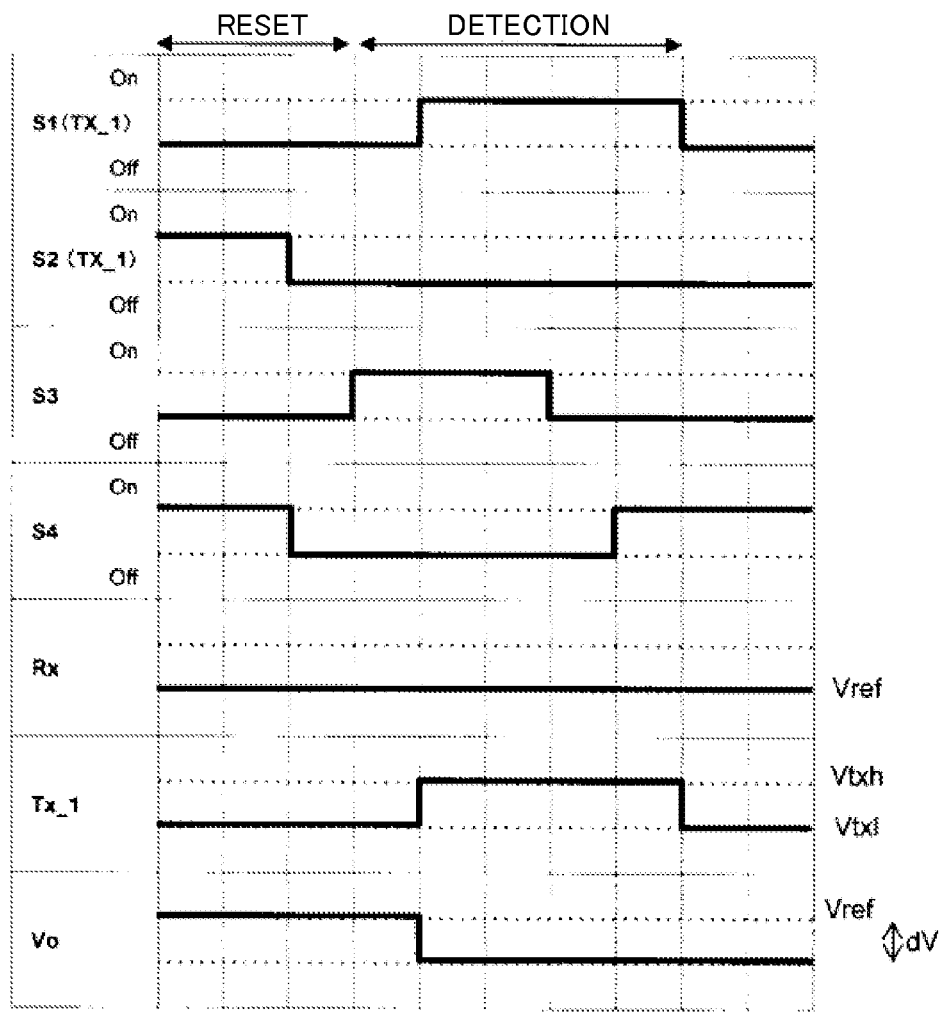

FIGS. 6A and 6B are views that describe the mutual detection in the touch panel-integrated display device.

As mentioned above, in the touch panel-integrated display device, the counter electrode (the Y electrode 202 of FIGS. 4A and 4B) and the detection electrode for sensor (the X electrode 201 of FIGS. 4A and 4B) are provided.

A mutual capacity 601 is formed between the electrodes. Herein, only one detection electrode for sensor (Rx_n; the X electrode 201 of FIGS. 4A and 4B) is noticed. Furthermore, six (Tx_1 to 6) counter electrodes (the Y electrodes 202 of FIGS. 4A and 4B) are provided.

The counter electrode (the Y electrode 202 of FIGS. 4A and 4B) has an earth capacity 601. Herein, since the earth capacity of the detection electrode for sensor of Rx_n (the X electrode 201 of FIGS. 4A and 4B) has the electrode structure described in FIGS. 4A and 4B, substantial mutual capacity 601 is obtained.

In the touch panel control unit 108, a voltage control unit having a pair of switching elements of S1 and S2 is provided with respect to each counter electrode (the Y electrode 202 of FIGS. 4A and 4B). Furthermore, herein, the voltage to be controlled is set to two voltage levels of Vtxh and Vtxl.

Furthermore, the detection electrode for sensor of Rx_n (the X electrode 201 of FIGS. 4A and 4B) is connected to the detection circuit unit via a pair of switching elements of S3 and S4. In addition, in FIGS. 6A and 6B, the detection circuit unit is constituted by the integration circuit. Furthermore, in FIGS. 6A and 6B, the voltage level of the reference voltage of the integration circuit is shown by Vref, and the voltage level of the output voltage of the integration circuit is shown by Vo.

Hereinafter, the control of the mutual detection will be described based on the circuit configuration shown in FIG. 6A.

The basic operation of the mutual detection includes a reset period and a detection period. The detection is repeatedly performed in the unit of the basic operation, and the counter electrodes becoming the target (the Y electrode 202 of FIG. 4) are sequentially changed. FIGS. 6A and 6B show a case where the counter electrode of Tx_1 in the counter electrode (the Y electrode 202 of FIGS. 4A and 4B) is a target.

The reset period is a period that resets the electric potential of the counter electrode of Tx_1. At this period, since the switching element (S4) and the switching element (S2) are connected to each other, the mutual capacity 601 is set to a state of being charged with the voltage of (Vref−Vtxl). In addition, in FIG. 6B, the voltage of the Vtxl is shown as 0 V.

Next, the switching element (S4) and the switching element (S2) enter the open state together, and are shifted to the detection period.

In the detection period, first, the switching element (S3) is connected, and the input to the integration circuit is possible. After that, the switching element (S1) is connected, and the electric potential of the counter electrode of Tx_1 transits from the voltage of Vtxl to the voltage of Vtxh. At this time, the electric current flows via the mutual capacity 601. Since the electric current is integrated by the integration circuit, the output voltage (Vo) of the integration circuit changes.

Furthermore, since the electric current is proportional to the magnitude of the mutual capacity 601, when there is a conductor such as a finger, the capacity thereof drops, and thus the electric current also drops. Thereby, since the output voltage (Vo) of the integration circuit also changes, the detection thereof is possible.

Thereafter, after the switching element (S3) is opened and the integration circuit is detached, the switching element (S4) is connected.

Thereafter, the switching element (S2) is connected. After that, this operation is repeated.

Hereinafter, in the touch panel-integrated display device, a type (hereinafter referred to as a self detection) of detecting whether or not the measurement target approaches even if there is no coordinate information, by the use of the change of the earth capacity of the detection electrode for sensor (the X electrode 201 of FIGS. 4A and 4B) by the influence of a finger of a user will be described.

Figure 7A:
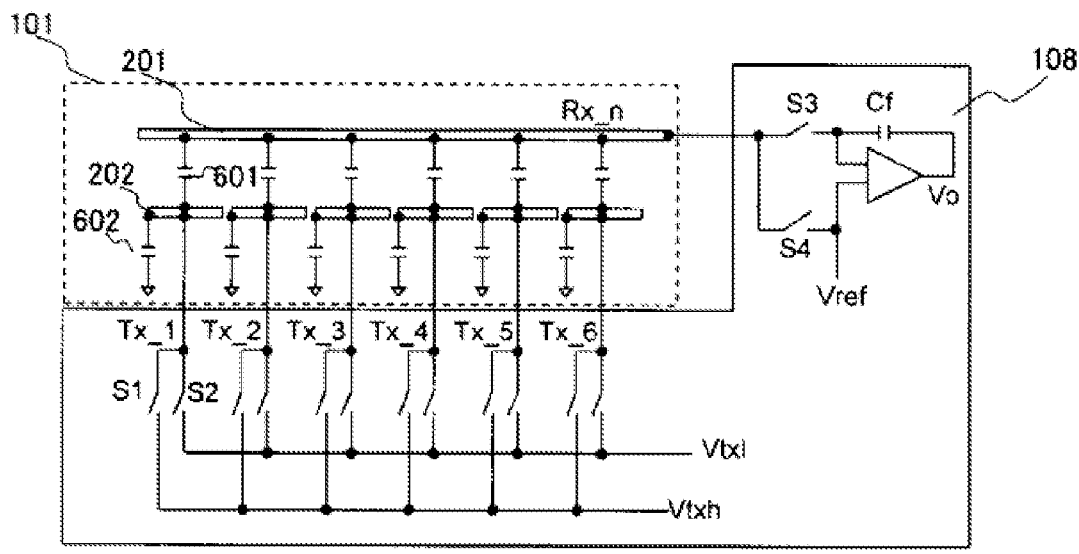
FIGS. 7A and 7B are views that describe the control of the self detection of the present example in the touch panel-integrated display device.
Figure 7B:
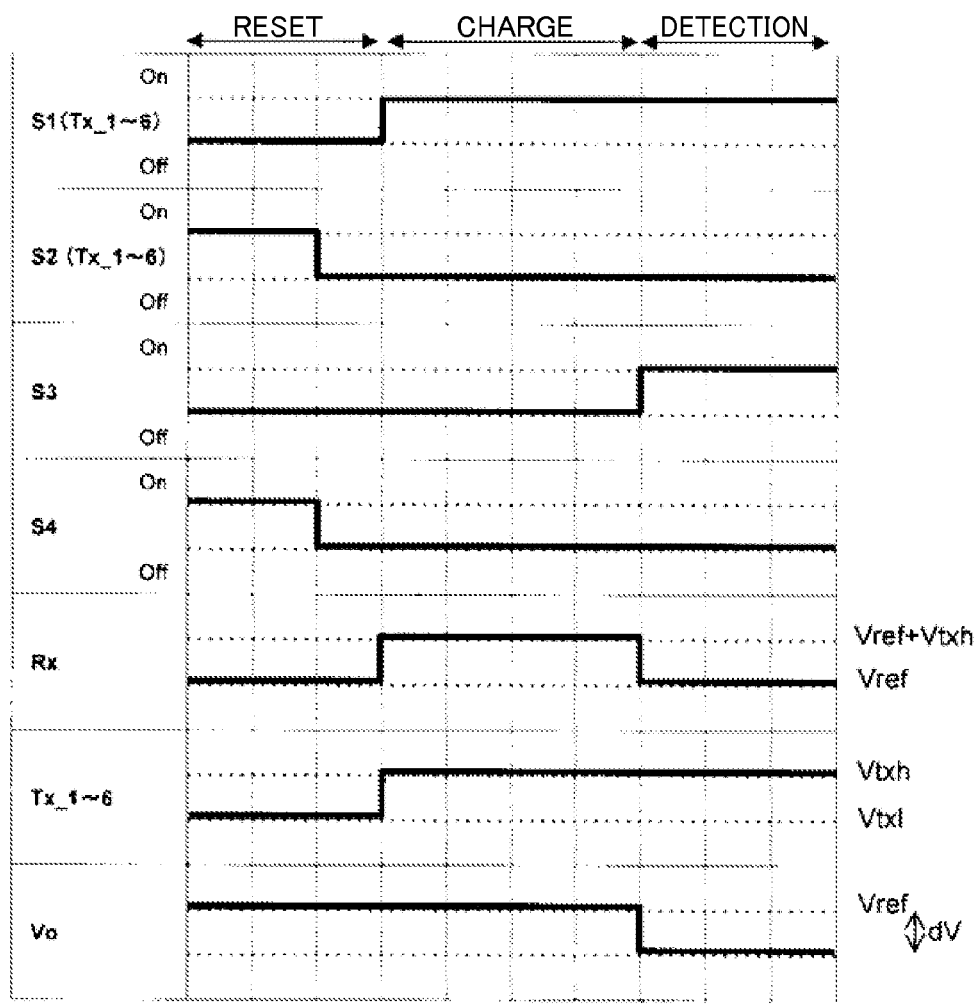

FIGS. 7A and 7B are views that describe the control of the self detection of the present example in the touch panel-integrated display device. Hereinafter, the control of the self detection will be described based on the circuit configuration shown in FIG. 7A.

The self detection period includes the respective periods of the reset period, the charge period, and the detection period. Herein, the control of the switching element (S1) and the switching element (S2) is concurrently performed in the entire counter electrodes (the Y electrode 202 of FIGS. 4A and 4B; Tx_1 to 6). Furthermore, herein, only one detection electrode for sensor (Rx_n; the X electrode 201 of FIGS. 4A and 4B) will be noticed.

In the reset period, since the switching element (S2) and the switching element (S4) are connected to each other and the mutual capacity 601 is reset, the mutual capacity 601 enters the state of being charged with the voltage of (Vref−Vtxl). Thereby, the electric potential of the detection electrode for sensor of Rx_n (the X electrode 201 of FIGS. 4A and 4B) becomes the voltage of Vref.

Next, the switching element (S2) and the switching element (S4) are opened together, and transits to the charge period. At this time, the switching element (S3) and the switching element (S4) enter the open state together, then the switching element (S1) is connected, and the electric potential of the entire counter electrode (Tx_1 to 6) becomes the voltage of Vtxh.

In the reset period, since the mutual capacity 601 is charged with the voltage of (Vref−Vtxl), the electric potential of the detection electrode for sensor of Rx_n (the X electrode 201 of FIGS. 4A and 4B) becomes the voltage of (Vref−Vtxl+Vtxh) at the charge period. In addition, in FIG. 7B, the voltage of Vtxl is shown as 0 V.

When there is a finger or the like near the detection electrode for sensor of Rx_n (the X electrode 201 of FIGS. 4A and 4B), the change of the electric potential of the detection electrode for sensor of Rx_n (the X electrode 201 of FIGS. 4A and 4B) also concurrently charges the electrostatic capacity formed between the finger and the detection electrode for sensor of Rx_n (the X electrode 201 of FIGS. 4A and 4B).

After the charge period, the period is shifted to the detection period. At this time, the switching element (S1) and the switching element (S3) are connected to each other, and the switching element (S2) and the switching element (S4) are opened. When the switching element (S3) is connected, the capacity between the detection electrode for sensor of Rx_n (the X electrode 201 of FIGS. 4A and 4B) and all the counter electrodes (Tx_1 to 6), that is, the capacity corresponding to the electric potential difference of (Vtxh−Vtxl) in the electric charge charged in the mutual capacity 601, and the electric charge charged in the electrostatic capacity between the detection electrode for sensor of Rx_n (the X electrode 201 of FIGS. 4A and 4B) and a finger or the like is moved to the integration circuit. The output voltage (Vo) of the integration circuit changes due to the electric charge.

Herein, when there is no finger or the like near the detection electrode for sensor of Rx_n (the X electrode 201 of FIGS. 4A and 4B), since there is no electric charge charged in the electrostatic capacity between the detection electrode for sensor of Rx_n (the X electrode 201 of FIGS. 4A and 4B) and a finger or the like, the amount of electric charge moved to the integration circuit is small, and thus the output change of the integration circuit becomes smaller.

Thereby, the self detection becomes possible. Thereafter, this operation is repeated.

Figure 8A:
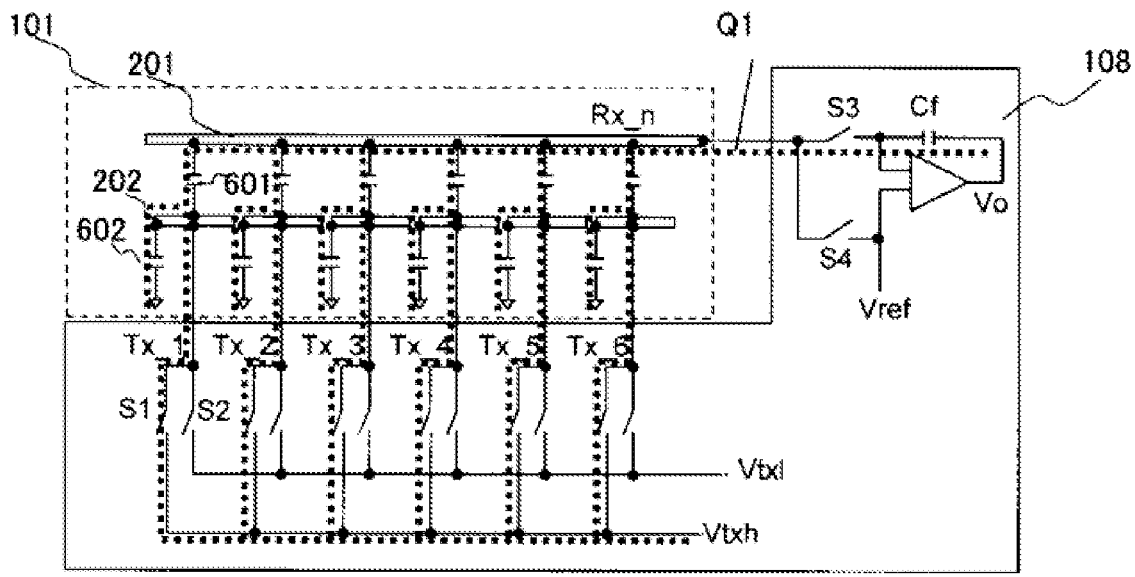
FIGS. 8A and 8B are views that describe the detection state of the self detection of the present example in the touch panel-integrated display device.
Figure 8B:
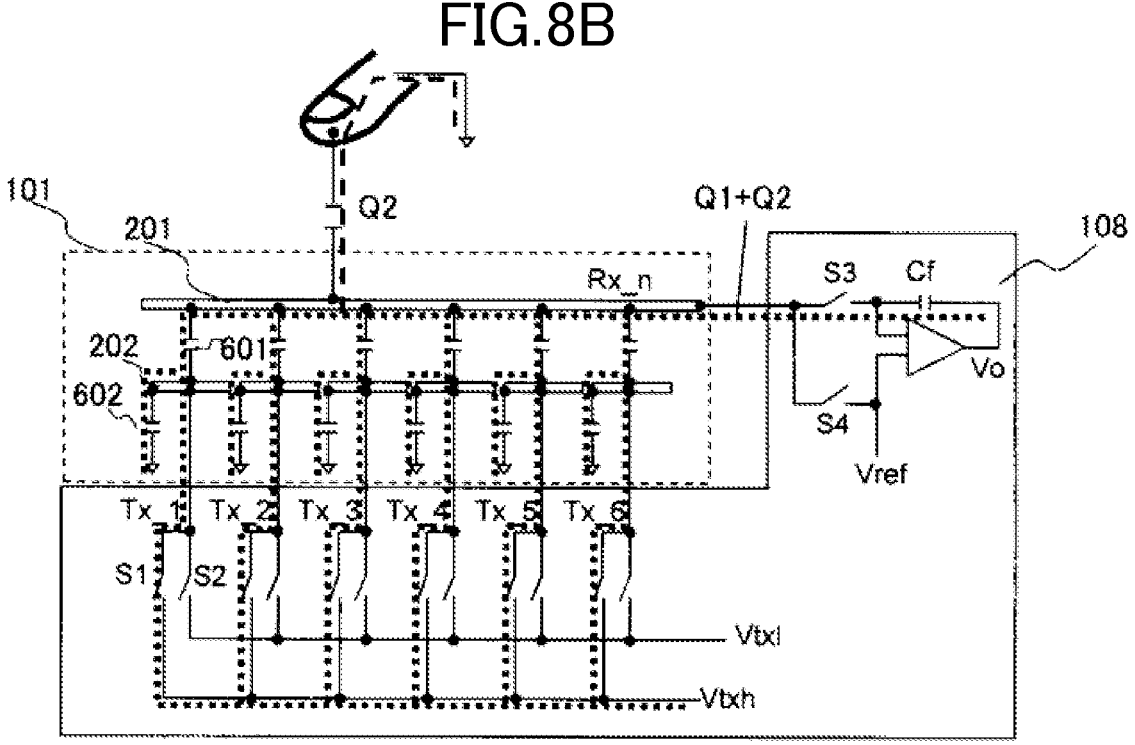

FIGS. 8A and 8B are views that describe the detection state of the self detection of the present example in the touch panel-integrated display device.

FIG. 8A shows a case where a finger or the like does not approach in the detection period described in FIGS. 7A and 7B. The amount of electric charge, which is read from the detection electrode for sensor of Rx_n (the X electrode 201 of FIGS. 4A and 4B), is an electric charge (Q1) that is charged due to the structure of the mutual capacity 601 or the like.

FIG. 8B shows a case where a finger or the like approaches in the detection period described in FIGS. 7A and 7B. The amount of electric charge, which is read from the detection electrode for sensor of Rx_n (the X electrode 201 of FIGS. 4A and 4B), is a sum (Q1+Q2) of the electric charge (Q1) charged due to the structure of the mutual capacity 601 or the like and an electric charge (Q2) charged between the detection electrode for sensor of Rx_n (the X electrode 201 of FIGS. 4A and 4B) and a finger or the like. Thereby, it is possible to detect the present or absence of a detection object (for example, a finger) by the voltage difference of the output voltage of the integration circuit.

In addition, since the integration circuit is provided for each detection electrode for sensor (the X electrode 201 of FIGS. 4A and 4B), in the self detection period, the output voltage (Vo) is output from the integration circuit provided in each detection electrode for sensor (the X electrode 201 of FIGS. 4A and 4B), respectively.

In this case, for example, as the determination of the present or absence of the detection object (for example, a finger), when the output voltage (Vo) that is output from one integration circuit of the plurality of integration circuits is a predetermined value or more, it may be determined that there is a detection object, when the output voltage (Vo), which is output from the integration circuit more than half of the plurality of integration circuits, is a predetermined value or more, it may be determined that there is a detection object, or when the output voltages (Vo), which are output from all the integration circuits, are predetermined values or more, it may be determined that there is a detection object.

Hereinafter, a more specific configuration of the liquid crystal touch panel-integrated display device of the example of the invention will be described.

Figure 9:
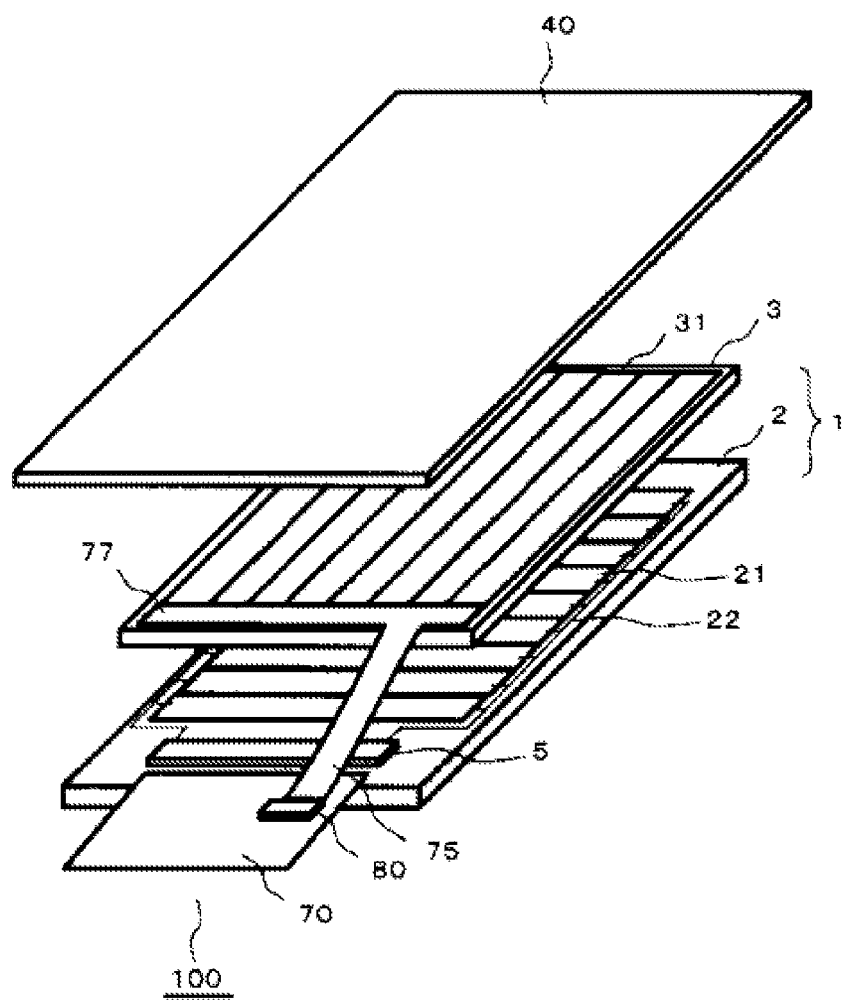
FIG. 9 is a perspective view that shows a more specific configuration of the touch panel-integrated display device of an example of the invention.

FIG. 9 is a perspective view that shows a more specific configuration of the liquid crystal touch panel-integrated display device of the example of the invention. A liquid crystal display device 100 shown in FIG. 9 includes a liquid crystal display panel 1, a drive circuit 5, a flexible substrate 70, a front panel 40, a storage case (not shown), and a backlight (not shown).

The liquid crystal display panel 1 has a TFT substrate 2 and a color filter substrate 3. The TFT substrate 2 and the color filter substrate 3 are stacked each other at a predetermined interval, both substrates are bonded to each other by a sealing material (not shown) provided near a peripheral portion between both substrates, a liquid crystal composition is enclosed and sealed inside the sealing material, and a polarizing plate is stuck to the outside of both substrates.

The TFT substrate 2 is provided with a counter electrode 21, and a counter electrode signal line 22 connected to the counter electrode 21 from the drive circuit 5. The counter electrode signal can be transmitted from the drive circuit 5 to the counter electrode 21 via the counter electrode signal line 22. The color filter substrate 3 is provided with the detection electrode 31 (the X electrode 201 of FIGS. 4A and 4B), and the detection electrode 31 is connected to a flexible substrate 75 using a connection portion 77. The flexible substrate 75 is connected to the flexible substrate 70 using a connector 80. The detection signal from the detection electrode 31 is transmitted to the drive circuit 5 via the flexible substrate 75, the connector 80, and the flexible substrate 70.

In addition, the liquid crystal display panel 1 has a display unit including a plurality of pixels in a matrix form. The counter electrode 21 is placed to face the pixel electrode in the pixel. By applying the voltage between both electrodes, the orientations of the liquid crystal molecules change. Along with the change of the orientation of the liquid crystal molecules, the transmittance of light changes, and the image is displayed.

Figure 10:
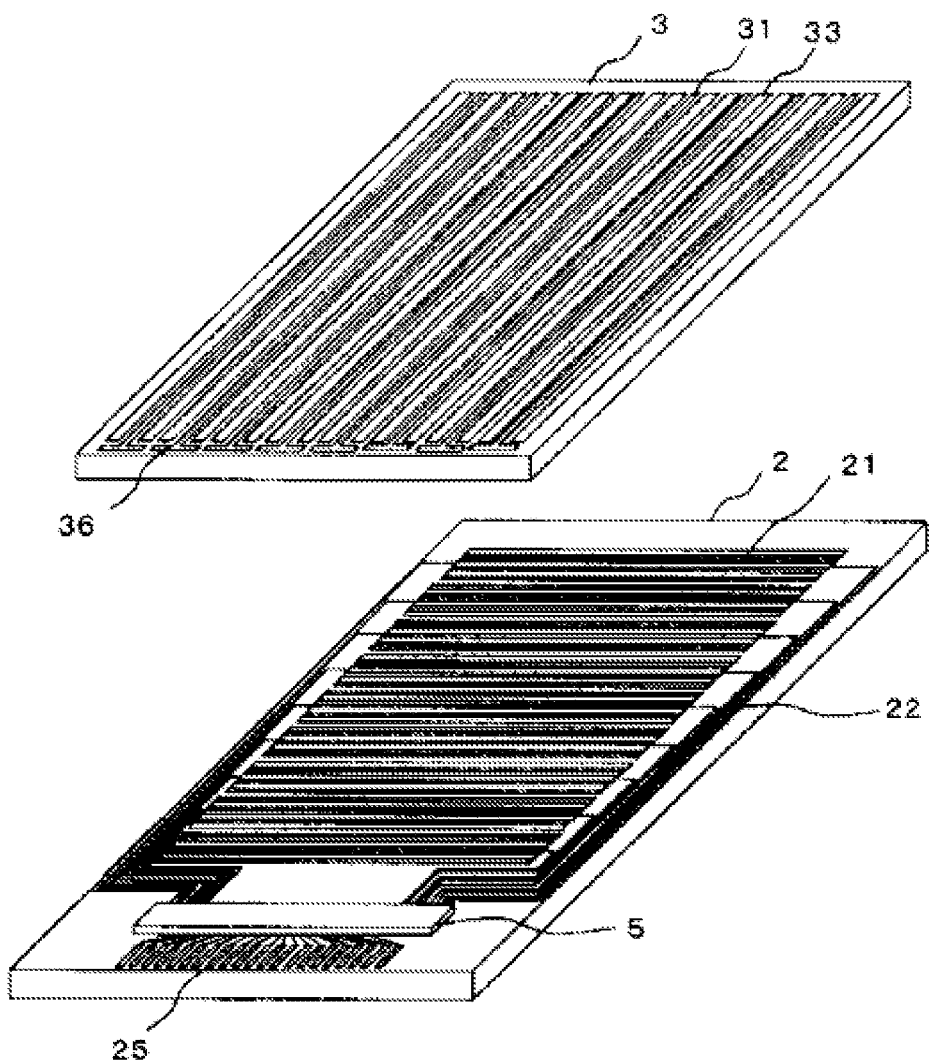
FIG. 10 is a view that describes a counter electrode and a detection electrode in the liquid crystal touch panel-integrated display device shown in FIG. 9.

Next, the detection electrode 31 and the counter electrode 21 of the liquid crystal display device 100 shown in FIG. 9 will be described using FIG. 10.

As mentioned above, although the counter electrode 21 is provided on the TFT substrate 2, the counter electrodes 21 of plural lines (for example, about twenty) are commonly connected to both ends, and are connected to the counter electrode signal line 22. The counter electrode signal is supplied to the fascicular counter electrode 21 from the drive circuit 5.

In the liquid crystal display device 100 shown in FIG. 9, the fascicular counter electrode 21 also serves as the Y electrode 202 shown in FIGS. 4A and 4B, and forms the scanning electrode of the invention. Furthermore, the detection electrode 31 corresponds to the X electrode 201 of FIGS. 4A and 4B, and forms the detection electrode of the invention.

Thus, the counter electrode signal includes the counter voltage used for the image display, and the drive signal (the input pulse voltage of FIGS. 7A and 7B) used for the detection of the touch position. When the drive signal is applied to the counter electrode 21, the detection signal is generated in the detection electrode 31 that is placed at a fixed interval with the counter electrode 21 to form the capacity. The detection signal is taken out to the outside via the terminal 36 for the detection electrode.

In addition, dummy electrodes 33 are formed on both sides of the detection electrode 31. The detection electrode 31 forms the T-shaped terminal 36 for the detection electrode of expanded toward the dummy electrode 33 side in one end portion. Furthermore, the TFT substrate 2 is also formed with various wirings, terminals or the like such as the input terminal 25 for the drive circuit, in addition to the counter electrode signal line 22.

Figure 11:
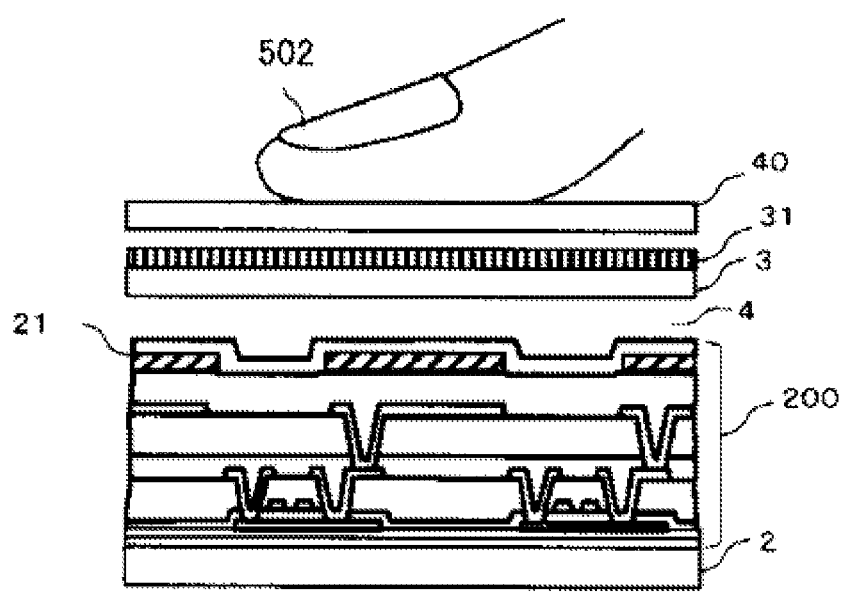
FIG. 11 is a cross-sectional view that shows apart of a cross section of a display unit of the liquid crystal touch panel-integrated display device shown in FIG. 9 in an enlarged manner.

FIG. 11 shows an enlarged schematic cross-sectional view of apart of the cross section of the display unit in the liquid crystal display device 100 shown in FIG. 9.

As shown in FIG. 11, a pixel unit 200 is provided on the TFT substrate 2, and the counter electrode 21 is used for the image display as a part of the pixel. Furthermore, the liquid crystal composition 4 is interposed between the TFT substrate 2 and the color filter substrate 3. The detection electrode 31 provided in the color filter substrate 3 and the counter electrode 21 provided in the TFT substrate form the capacity, and when the drive signal is applied to the counter electrode 21, the voltage of the detection electrode 31 changes.

At this time, as shown in FIG. 11, when a conductor such as a finger approaches or comes into contact therewith via the front panel 40, the capacity changes, and the voltage generated in the detection electrode 31 changes compared to a case where there is no approach and contact.

In this manner, by detecting the change of the capacity generated between the counter electrode 21 formed on the liquid crystal display panel 1 and the detection electrode 31, the liquid crystal display panel 1 is able to include the function of the touch panel.

As described above, in the present embodiment, in the touch panel-integrated display device, the detection circuit used for the mutual detection can also be used for the self detection, and thus it is possible to realize the miniaturization and the cost reduction of the control IC.

As mentioned above, although the invention made by the inventors has been specifically described based on the abovementioned example, the invention is not limited to the abovementioned example, and, of course, can be changed within the scope that does not depart from the gist thereof in various forms.

While there have been described what are at present considered to be certain embodiments of the invention, it will be understood that various modifications may be made thereto, and it is intended that the appended claim cover all such modifications as fall within the true spirit and scope of the invention.

What is claimed is:

1. A display device comprising:
   a display panel; and
   a touch panel integrated in the display panel,
   wherein the touch panel has
      a plurality of scanning electrodes formed on the display panel,
      a plurality of detection electrodes that is formed on the display panel and intersects with the plurality of scanning electrodes,
      drive signal supply unit for inputting a drive signal to each of the scanning electrodes,
      detection unit for acquiring a detection signal from each of the detection electrodes,
      touch position detection unit for detecting a touch position of an detection object based on the detection signal detected from each of the detection unit when the drive signal is sequentially input to each of the scanning electrodes from the drive signal supply unit, and
      approach detection unit for detecting that the detection object approaches the touch panel based on the detection signal detected from each of the detection unit when a scanning voltage is collectively input to all of the scanning electrodes from the drive signal supply unit.

2. The display device according to claim 1,
   wherein the drive signal supply unit has
      a switching element S1 that supplies a drive voltage Vtxh to each of the plurality of scanning electrodes, and
      a switching element S2 that supplies a drive voltage Vtxl (Vtxl<Vtxh) to each of the plurality of scanning electrodes,
   the detection unit has
      an integration circuit in which a reference voltage Vref is input to one terminal,
      a switching element S3 that is connected between each of the detection electrodes and the other terminal of the integration circuit, and
      a switching element S4 that is connected between each of the detection electrodes and the one terminal of the integration circuit,
   the switching element S1 and the switching element S2 are provided for each of the scanning electrodes, and
   the integration circuit, the switching element S3 and the switching element S4 are provided for each of the detection electrodes.

3. The display device according to claim 2,
   wherein a touch position detection period of the detection object has a reset period and a detection period for each of the scanning electrodes,
   in the reset period in a scanning electrode of a scanning target to which the drive signal is input, the switching element S1 of the scanning electrode of the scanning target is turned off, the switching element S2 of the scanning electrode of the scanning target is turned on, the switching element S1 and the switching element S2 of the scanning electrode other than the scanning target are turned off, the switching elements S3 of all the detection electrodes are turned off, and the switching elements S4 of all the detection electrodes are turned on, the capacity between the scanning electrode of the scanning target and all the detection electrodes is charged with a voltage of (Vref−Vtxl),
   in the detection period, the switching element S1 of the scanning electrode of the scanning target is turned on, the switching element S2 of the scanning electrode of the scanning target is turned off, the switching element S1 and the switching element S2 of the scanning electrode other than the scanning target are turned off, all the switching elements S3 are turned on, all the switching elements S4 are turned off, and the electric current flowing in the capacity between the scanning electrode of the scanning target and all the detection electrodes is integrated by the integration circuit provided for each of the detection electrodes, and
   the touch position detection unit detects the touch position of the detection object, based on the output voltage of the integration circuit provided for each of the detection electrodes.

4. The display device according to claim 2,
   wherein the approach detection period of the object to the detected has a reset period, a charge period, and a detection period,
   in the reset period, the switching elements S1 of all the scanning electrodes are turned off, the switching elements S2 of all the scanning electrode are turned on, the switching elements S3 of all the detection electrodes are turned off, and the switching elements S4 of all the detection electrodes are turned on, and the capacity between all the scanning electrodes and all the detection electrodes is charged with a voltage of (Vref−Vtxl),
   in the charge period, the switching elements S1 of all the scanning electrodes are turned on, the switching elements S2 of all the scanning electrodes are turned off, the switching elements S3 of all the detection electrodes are turned off, and the switching elements S4 of all the detection electrodes are turned off, and the capacity between all the scanning electrodes and each of the detection electrodes is charged with a voltage of (Vref−Vtxl+Vtxh),
   in the detection period, the switching elements S1 of all the scanning electrodes are turned on, the switching elements S2 of all the scanning electrodes are turned off, the switching elements S3 of all the detection electrodes are turned on, and the switching elements S4 of all the detection electrodes are turned off, and the capacity between all the scanning electrodes and each of the detection electrodes is integrated by the integration circuit provided for each of the detection electrodes, and the approach detection unit detects that the detection object approaches, based on the output voltage of the integration circuit provided for each of the detection electrodes.

5. The display device according to claim 1,
wherein the plurality of scanning electrodes and the plurality of detection electrodes are formed on different surfaces.

6. The display device according to claim 1,
wherein one electrode of the plurality of scanning electrodes and the plurality of detection electrodes is formed on a surface of an observer side of the display panel, and
the other electrode of the plurality of scanning electrodes and the plurality of detection electrodes is formed on the inside of the display panel.

7. The display device according to claim 1,
wherein the display panel is a liquid crystal display panel that has a first substrate, a second substrate, and a liquid crystal layer interposed between the first substrate and the second substrate,
the second substrate is placed on the observer side,
one electrode of the plurality of scanning electrodes and the plurality of detection electrodes is formed on a surface of an opposite side to the liquid crystal layer of the second substrate, and
the other electrode of the plurality of scanning electrodes and the plurality of detection electrodes is formed on a surface of the liquid crystal layer side of the first substrate.

8. The display device according to claim 1,
wherein the plurality of scanning electrodes and the plurality of detection electrodes are stripe-shaped electrodes.

* * * * *